US009262755B2

(12) United States Patent
Ran (10) Patent No.: US 9,262,755 B2
(45) Date of Patent: Feb. 16, 2016

(54) MOBILE PAYMENT SYSTEM (75) Inventor: Alexander S. Ran, Palo Alto, CA (US)

(73) Assignee: INTUIT INC., Mountain View, CA (US)

(*) Notice: Subject to any disclaimer, the term of this patent is extended or adjusted under 35 U.S.C. 154(b) by 200 days.

(21) Appl. No.: 13/528,109

(22) Filed: Jun. 20, 2012

(65) Prior Publication Data

US 2013/0346222 A1 Dec. 26, 2013

(51) Int. Cl.
 G06Q 20/00 (2012.01)
 G06Q 20/20 (2012.01)
 G06Q 20/32 (2012.01)
 G06Q 20/38 (2012.01)
(52) U.S. Cl.
 CPC .............. *G06Q 20/20* (2013.01); *G06Q 20/204* (2013.01); *G06Q 20/327* (2013.01); *G06Q 20/385* (2013.01)
(58) Field of Classification Search
 CPC ...................... G06K 2209/015; G06K 2209/03
 USPC ................................................. 705/16, 17, 36
 See application file for complete search history.

(56) References Cited

U.S. PATENT DOCUMENTS

| 2006/0054695 | A1 | 3/2006 | Owada | |
| 2007/0187488 | A1* | 8/2007 | Martinez | G06Q 30/00 235/380 |
| 2009/0182634 | A1* | 7/2009 | Park et al. | 705/14 |
| 2010/0138344 | A1 | 6/2010 | Wong | |
| 2010/0262543 | A1 | 10/2010 | Shin | |
| 2010/0287085 | A1* | 11/2010 | Joubert | G06Q 20/28 705/35 |
| 2012/0006891 | A1* | 1/2012 | Zhou | G06Q 20/3274 235/380 |
| 2012/0054046 | A1* | 3/2012 | Albisu | G06Q 20/20 705/16 |
| 2012/0173348 | A1* | 7/2012 | Yoo et al. | 705/16 |

FOREIGN PATENT DOCUMENTS

| KR | 1020020017972 A | 3/2002 |
| KR | 1020040041916 A | 5/2004 |

* cited by examiner

*Primary Examiner* — Robert R. Niquette
*Assistant Examiner* — Rokib Masud
(74) *Attorney, Agent, or Firm* — Park, Vaughan, Fleming & Dowler LLP; Steven E. Stupp (57) ABSTRACT

During a financial transaction, a customer provides an identifier to a peripheral device (which may be a barcode scanner, a wireless receiver or a keyboard) coupled to the point-of-sale terminal. This identifier corresponds to a one-time payment credential token that includes financial information of the customer. Then, a service object executing on the point-of-sale terminal, which acts as a driver for the peripheral device, performs one or more operations based on at least the identifier to obtain the financial information. After providing the financial information and transaction information associated with the financial transaction to a financial institution specified in the financial information, the point-of-sale terminal receives a confirmation from the financial institution that the financial transaction has been completed.

19 Claims, 5 Drawing Sheets

MOBILE PAYMENT SYSTEM

CROSS REFERENCE TO RELATED APPLICATION

This application is related to U.S. patent application Ser. No. 13/489,600, entitled "Mobile Payment Via a Virtual Peripheral Device," by Alexander S. Ran, which was filed on Jun. 6, 2012, the contents of which are herein incorporated by reference in its entirety.

FIELD

The present disclosure relates to a technique for conducting a financial transaction at a point-of-sale terminal.

SUMMARY

The disclosed embodiments relate to a point-of-sale terminal that conducts a financial transaction. During operation, the point-of-sale terminal receives an identifier associated with a customer via a peripheral device coupled to the point-of-sale terminal and a service object executing on the point-of-sale terminal. For example, the identifier may be received by from a portable electronic device. This identifier corresponds to a one-time payment credential token that includes financial information of the customer, and the service object acts as a driver for the peripheral device. Then, the point-of-sale terminal performs one or more operations based on at least the identifier to obtain the financial information. Moreover, the point-of-sale terminal provides the financial information and transaction information associated with the financial transaction to a financial institution specified in the financial information. Next, the point-of-sale terminal receives a confirmation (for example, from the financial institution) that the financial transaction has been completed.

Note that the one or more operations may include: providing the identifier to a third party, where the third party is other than the financial institution; receiving the one-time payment credential token from the third party; and extracting the financial information from the one-time payment credential token. Alternatively, the one or more operations may include: generating the one-time payment credential token from the identifier; and/or extracting the financial information from the one-time payment credential token.

In some embodiments, the service object includes a magnetic-stripe-reader service object.

Furthermore, the identifier may be included in the one-time payment credential token, and the peripheral device may include a barcode scanner that captures an image of a barcode that includes the one-time payment credential token, which may be provided by the portable electronic device.

Note that the service object executing on the point-of-sale terminal may present the barcode scanner to the point-of-sale terminal as a keyboard. For example, the service object executing on the point-of-sale terminal may accept the token from the keyboard because the input from a barcode scanner is often seen by the point-of-sale terminal as a keyboard input.

In some embodiments, the peripheral device includes: a barcode scanner, a wireless receiver and/or a keyboard.

Additionally, the one-time payment credential token may only be valid for the financial transaction.

Another embodiment provides a method that includes at least some of the operations performed by the point-of-sale terminal.

Another embodiment provides a computer-program product for use with the point-of-sale terminal. This computer-program product includes instructions for at least some of the operations performed by the point-of-sale terminal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a point-of-sale terminal, a technique for conducting a financial transaction, and a computer-program product (e.g., software) for use with the point-of-sale terminal are described. During the financial transaction, point-of-sale-terminal software executes a software module that obtains customer financial information for payment authorization by a payment processing service. In particular, a customer may use a portable electronic device (such as a cellular telephone) to provide an identifier to a peripheral device (which may be a barcode scanner, a wireless receiver or a keyboard) coupled to the point-of-sale terminal. This identifier corresponds to a one-time payment credential token that includes financial information of the customer. Then, a service object executing on the point-of-sale terminal, which acts as a driver for a peripheral device coupled to the point-of-sale terminal, performs one or more operations based on at least the identifier to obtain the financial information. After providing the financial information and transaction information associated with the financial transaction to a financial institution specified in the financial information, the point-of-sale terminal receives a confirmation from the financial institution that the financial transaction has been completed.

By allowing the customer to conduct the financial transaction without requiring changes to the point-of-sale terminal, the merchant-acquirer payment-processor service, or existing portable electronic devices, this financial technique may facilitate commercial activity. In particular, the financial technique may facilitate low-cost and simple mobile payments via a cellular telephone. In this way, the financial technique provides a software solution that can be broadly adopted with little or no expense or inconvenience for merchants or customers.

In the discussion that follows, a user or a customer may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
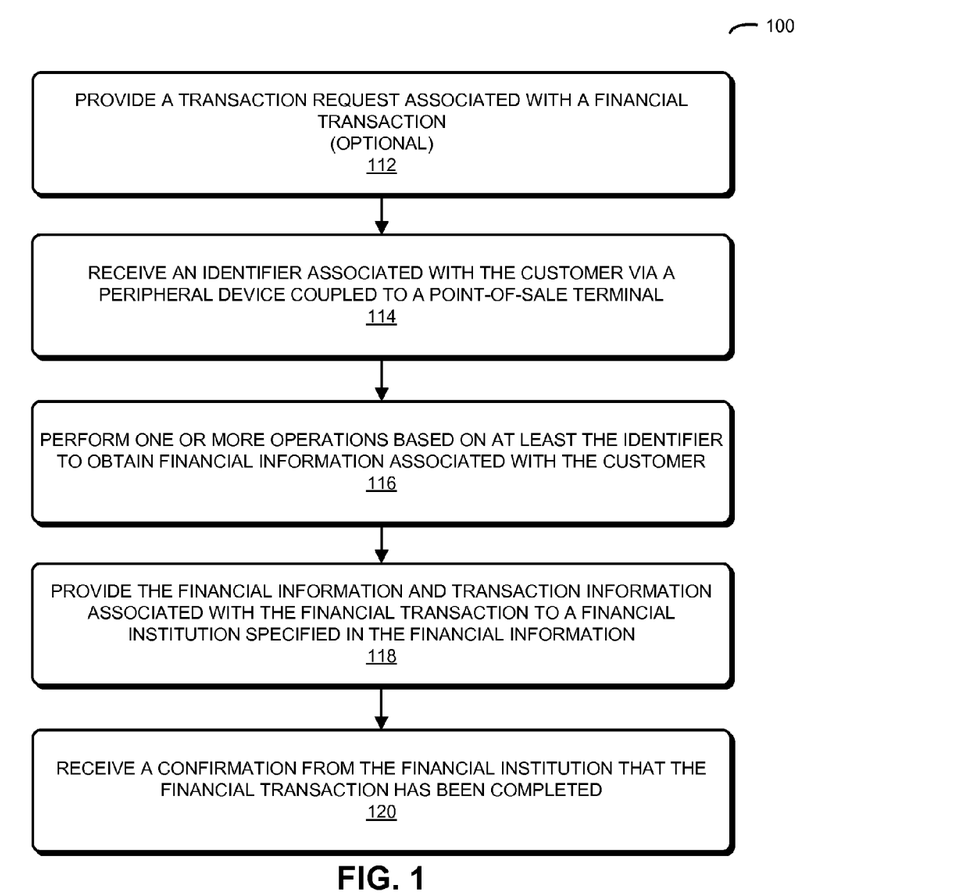
FIG. 1 is a flow chart illustrating a method for conducting a financial transaction in accordance with an embodiment of the present disclosure.
Figure 4:
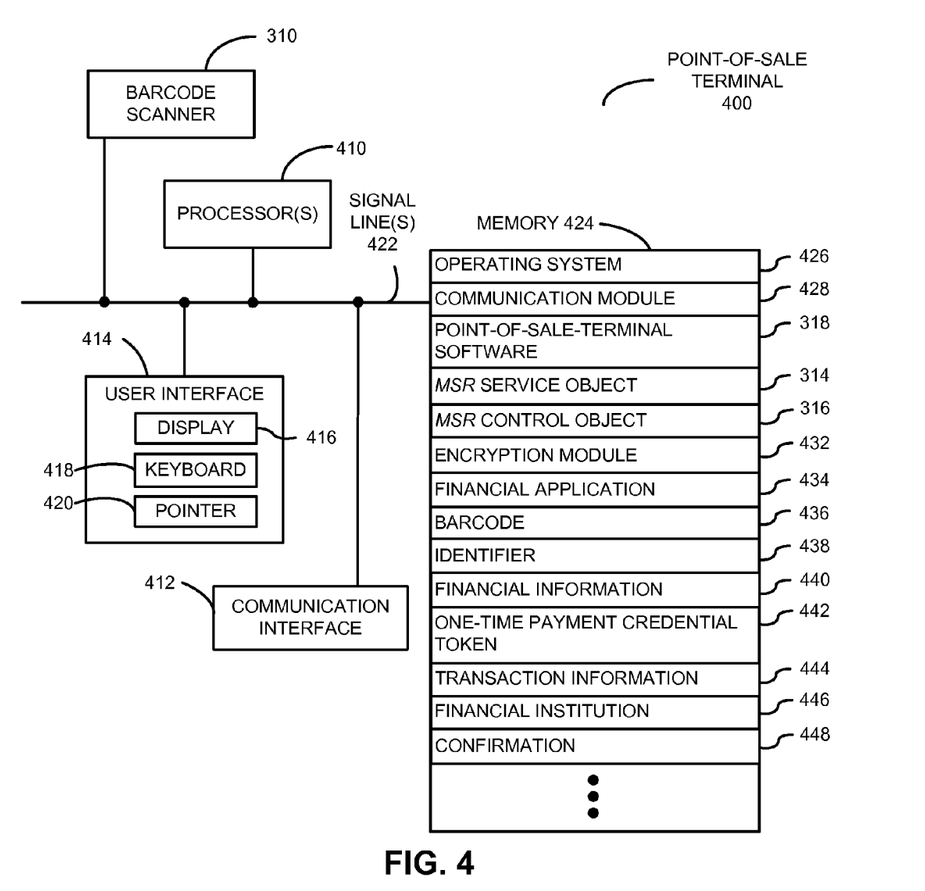
FIG. 4 is a block diagram illustrating a point-of-sale terminal that performs the method of FIGS. 1 and 2 in accordance with an embodiment of the present disclosure.

We now describe embodiments of the financial technique, which may be performed by a point-of-sale terminal (such as point-of-sale terminal 400 in FIG. 4). FIG. 1 presents a flow chart illustrating a method 100 for conducting a financial transaction. During operation, the point-of-sale terminal (such as a cash register) receives an identifier associated with a customer via a peripheral device coupled to the point-of-sale terminal (operation 114). This identifier corresponds to a one-time payment credential token (e.g., the one-time payment credential token may only be valid for the financial transaction) that includes financial information of the customer.

Then, the point-of-sale terminal performs one or more operations based on at least the identifier to obtain the financial information (operation 116). As described further below with reference to FIG. 2, the identifier may be included in the one-time payment credential token (which is sometimes referred to as a 'transient payment credential token'), and the peripheral device includes a barcode scanner that captures an image of a barcode that includes the one-time payment credential token, which is provided by the portable electronic device. This barcode may be generated on the portable electronic device or it may be received by the portable electronic device from a third party, where the third party may or may not be other than a financial institution specified in the financial information (such as a provider of the financial technique).

Alternatively, the one or more operations may include: providing the identifier to the third party; receiving the one-time payment credential token from the third party; and extracting the financial information from the one-time payment credential token. For example, the identifier may be provided to the third party: via the portable electronic device of the customer (i.e., indirectly) and/or via a network coupled to the point-of-sale terminal (i.e., directly). Alternatively, the one or more operations may include: generating the one-time payment credential token from the identifier; and/or extracting the financial information from the one-time payment credential token (if the one-time payment credential token is received from the portable electronic device).

In some embodiments, at least one of the operations is performed by a unified point-of-sale service object executing on the point-of-sale terminal. This unified point-of-sale service object may be or may acts as a driver for the peripheral device.

Thus, in different embodiments the one-time payment credential token may be: dynamically generated and provided by the portable electronic device, received by the portable electronic device from the third party and then provided to the point-of-sale terminal, dynamically generated on the point-of-sale terminal, and/or received by the point-of-sale terminal from the third party.

Because barcode scanners at the point-of-sale terminal are used to read Universal product codes, and a Universal Product Code typically only includes 11 digits, the unified point-of-sale service object executing on the point-of-sale terminal may overcome this limitation by extending the information obtained from the barcode scanner to constitute a well-formed payment credential expected by, for example, a magnetic-stripe-reader control object. Alternatively or additionally, the unified point-of-sale service object executing on the point-of-sale terminal may accept the token from the keyboard because the input from a barcode scanner is often seen by the point-of-sale terminal as a keyboard input.

Moreover, the point-of-sale terminal provides the financial information and transaction information (operation 118) associated with the financial transaction to the financial institution specified in the financial information. For example, the financial institution may include a merchant-acquirer processor in a payment card network (such as a credit- or a debit-card network). In some embodiments, the one-time payment credential token is also provided to the financial institution.

Next, the point-of-sale terminal receives a confirmation (operation 120) from the financial institution that the financial transaction has been completed. For example, providing the financial information and the transaction information (operation 118) associated with the financial transaction, and receiving the confirmation (operation 120) may occur via a magnetic-stripe-reader service object. This magnetic-stripe-reader service object, as well as the other-mentioned unified point-of-sale service object, may be compatible with a unified point-of-sale standard, such as the UnifiedPOS or UPOS standard (from the National Retail Federation of Washington, D.C.).

In some embodiments, prior to receiving the identifier (operation 114) the point-of-sale terminal optionally provides a transaction request associated with the financial transaction (operation 112) from point-of-sale-terminal software executing on the point-of-sale terminal to the unified point-of-sale service object. In response to this transaction request, the unified point-of-sale service object may await the identifier from the peripheral device.

Figure 2:
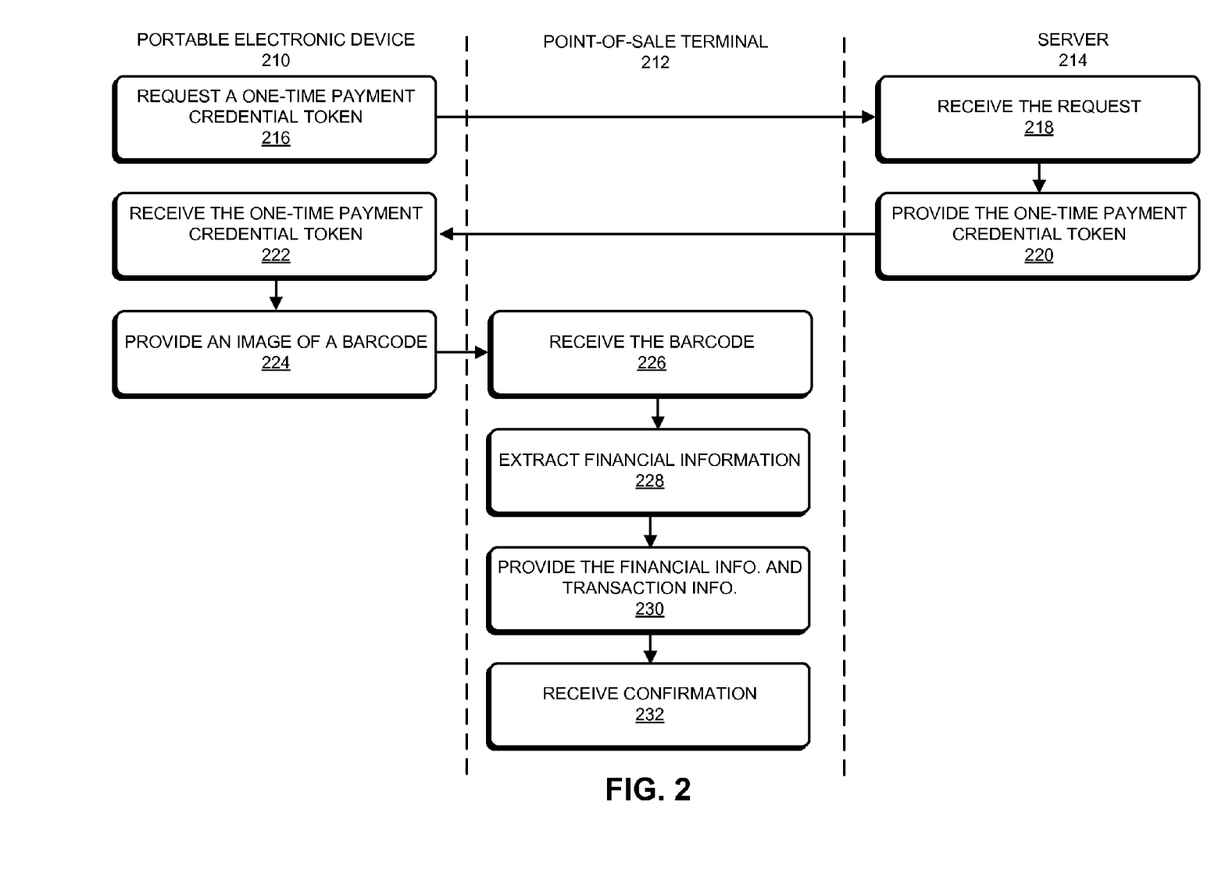
FIG. 2 is a drawing illustrating the method of FIG. 1 in accordance with an embodiment of the present disclosure.

In an exemplary embodiment, the financial technique is implemented using the portable electronic device, the point-of-sale terminal and at least one server, which communicate through a network, such as a cellular-telephone network and/or the Internet (e.g., using a client-server architecture). This is illustrated in FIG. 2, which presents a flow chart illustrating method 100 (FIG. 1). During this method, a user of portable electronic device 210 provides the identifier that identifies the user. For example, the user may be a customer, and portable electronic device 210 may be a cellular telephone. As shown in FIG. 2, portable electronic device 210 requests a one-time payment credential token (operation 216) from server 214, which may be associated with a third party that is other than the financial institution that will process the financial transaction and/or will make payment for the customer in the financial transaction, such as a provider of the financial technique.

In response to receiving the request (operation 218), server 214 provides the one-time payment credential token (operation 220). For example, when providing the one-time payment credential token, server 214 may access the pre-existing one-time payment credential token or may generate the one-time payment credential token.

Moreover, after receiving the one-time payment credential token (operation 222), portable electronic device 210 provides the one-time payment credential token (which includes or is the identifier) to point-of-sale terminal 212 in the form of an image of a barcode (operation 224), and more generally an image of a spatial pattern. Furthermore, the peripheral device (such as a barcode scanner) coupled to point-of-sale terminal 212 receives the barcode (operation 226).

Then, the unified point-of-sale service object executing on point-of-sale terminal 212 performs the one or more operations based on at least the identifier to obtain financial information associated with the customer. (As described further below with reference to FIG. 3, the unified point-of-sale service object may be or may act as the driver for the peripheral device.) For example, as shown in FIG. 2 the unified point-of-sale service object may extract the financial information (operation 228) from the one-time payment credential token. The financial information may include mobile-payment information for the customer, such as: an account identifier, an available amount that can be spent, a financial institution (such as a bank), a bank identification number (which defines transaction routing information), etc. Note that the financial information may be similar to that provided by a financial vehicle (such as a credit card), but has a different context because a physical credit card is not used in the described financial transaction.

Furthermore, point-of-sale terminal 212 may provide the financial information and the transaction information (operation 230) associated with the financial transaction to the financial institution specified in the financial information. For example, the transaction information may include: a transaction day/time, a merchant identifier, a product code and a transaction amount.

Note that the financial information and the transaction information may be received by a server associated with the financial institution (not shown), which then completes the financial transaction (for example, by authorizing or making payment on behalf of the consumer to the merchant associated with point-of-sale terminal 212). After the financial transaction is complete (not shown), this server may provide the confirmation that the financial transaction has been completed (not shown). Alternatively, the financial information and the transaction information may be received by server 214, which then completes the financial transaction (not shown) and provides the confirmation (not shown).

Additionally, point-of-sale terminal 212 receives the confirmation (operation 232). For example, the confirmation may be received via a magnetic-stripe-reader service object from a merchant acquirer payment processing service.

In some embodiments of method 100 (FIGS. 1 and 2), there may be additional or fewer operations. For example, instead of providing an image of a barcode (operation 224), portable electronic device 210 may convey the identifier and/or the one-time payment credential token using: wireless communication, near-field communication, an audio channel, and/or a video channel. Alternatively, the user may enter the identifier and/or the one-time payment credential token into a keypad. Therefore, instead of the barcode scanner, the peripheral device may include a wireless receiver or the keypad.

Moreover, instead of receiving the one-time payment credential token from portable electronic device 210, in some embodiments the one-time payment credential token may be generated by portable electronic device 210 based on the identifier received from portable electronic device 210, or a pre-existing one-time payment credential token that is stored on the point-of-sale terminal 212 may be accessed or looked-up based on the identifier received from portable electronic device 210.

Alternatively, instead of receiving the one-time payment credential token from portable electronic device 210, in some embodiments point-of-sale terminal 212 provides the identifier to server 214 via a network or via portable electronic device 210. In response, server 214 may provide the one-time payment credential token to point-of-sale terminal 212.

In method 100 (FIGS. 1 and 2), note that the order of the operations may be changed, and/or two or more operations may be combined into a single operation.

In an exemplary embodiment, the financial technique leverages the UPOS standard to integrate mobile payments with point-of-sale-terminal software. Most commercially available point-of-sale-terminal software (such as point-of-sale operating systems) supports the UPOS standard, which covers integration of peripheral devices, such as: a credit-authorization terminal, a magnetic-stripe reader, etc. The UPOS architecture is based on the concept of control objects and service objects. During operation of a point-of-sale terminal, the point-of-sale-terminal software interacts with one or more control objects for tasks such as credit-payment authorization. A control object connects to the appropriate service object that serves the role of a driver for an external or peripheral device that performs the task(s) and returns the result. For example, in the case of the credit-payment authorization, a credit-authorization-terminal service object is or acts as the driver for a credit-authorization terminal.

In the financial technique, mobile payments are integrated with the point-of-sale-terminal software by using a service object to drive the peripheral device. Thus, while driving an actual peripheral device, the service object implements the logic necessary to complete a task (in this case, the financial transaction). This logic may include interacting directly with the user's portable electronic device and/or with a server associated with the third party that facilitates or provides the financial technique (including optionally receiving the one-time payment credential token from the third party after the point-of-sale terminal optionally provided the identifier to the third party). In this way, the standard point-of-sale peripheral integration interface may be used to enable a software-only solution that facilitates mobile payments that work with a majority of existing point-of-sale-terminal software and hardware.

In an exemplary embodiment, a customer wants to purchase a product or a service from a merchant. A cashier at a point-of-sale terminal may ring up the purchased item(s). The cashier may also optionally invoke a barcode-scanner operation, such as that normally used for a store loyalty card. In response, the point-of-sale-terminal software may submit a transaction request to a barcode-scanner driver (i.e., the unified point-of-sale service object) that is provided by a provider of the financial technique. In response to this transaction request, the barcode-scanner driver may await the identifier and/or the one-time payment credential token from the peripheral device (such as a barcode scanner or a keyboard).

Next, a mobile-payment application executing on the portable electronic device (which may also be provided by the provider of the financial technique) provides the identifier and/or the one-time payment credential token (which may have been provided to the portable electronic device by the third party in response to a previous request by the mobile-payment application) to the barcode scanner and, thus, the barcode-scanner service object on the point-of-sale terminal. For example, the portable electronic device may display the barcode that includes the one-time payment credential token (and, thus, the identifier, which may be the same as the one-time payment credential token).

After receiving the one-time payment credential token, the barcode-scanner service object may return the one-time payment credential token (and, thus, the financial information associated with the user) to the point-of-sale-terminal software. Then, the point-of-sale terminal may extract the financial information (such as the mobile-payment information for the customer) from the one-time payment credential token.

In some embodiments, the cashier then optionally performs additional operations for awarding loyalty points, redeeming coupons and offers, etc.

Furthermore, after receiving the financial information, the cashier may perform a credit-authorization operation for the amount due using a merchant acquirer payment processing service. As described below with reference to FIG. 3, the merchant-acquirer processor may interact with server 214 to confirm that the one-time payment credential token is valid prior to authorizing payment and providing the confirmation to point-of-sale terminal 212.

In some embodiments, the point-of-sale-terminal software optionally prints a receipt using a UPOS printer service object that passes receipt information to the mobile-payment application and/or to server 214 (FIG. 2).

By using the peripheral device and a substitute unified point-of-sale service object, the financial technique may facilitate mobile payments using standard open-loop payment-card-network transactions at point-of-sale terminals with portable electronic devices (such as cellular telephones) as payment instruments that (directly or indirectly) convey the necessary financial information.

Note that there are several challenges associated with using an image of a barcode to provide the identifier and/or the one-time payment credential token to the point-of-sale terminal. Notably, if a portable electronic device displayed a barcode that includes payment-card-account information (such as a credit-card number), there would be a significant risk of fraud (a copy of the image could be used to conduct financial transactions). In addition, standard point-of-sale-terminal software typically does not use barcode scanners to obtain payment card credentials. Instead, point-of-sale-terminal software usually uses credit-authorization terminals or magnetic-stripe readers to obtain such financial information.

The first challenge can be addressed by generating transient payment credentials (such as the one-time payment credential token) for each financial transaction. However, the issuer of the mobile payment instrument (such as the financial institution) typically needs to be able to authorize financial transactions against a real user account. Therefore, during a given financial transaction, the issuer may need the ability to map the one-time payment credential token received in the payment processing flow to an actual user account. To do so, the issuer or the third party may generate the one-time payment credential token in response to a request from the mobile-payment application executing on the portable electronic device prior to the financial transaction while storing the association to the user's account until the financial-transaction processing is complete. Alternatively, the mobile-payment application can generate the one-time payment credential token and push it to the issuer or the third party prior to the financial transaction. Furthermore, if a trusted execution environment is available on the portable electronic device (either in the form of a secure element or a trusted execution mode of the main processor), a one-time payment-credential-token technique known to the issuer or the third party can be executed on the portable electronic device without the need to connect to the issuer or the third party prior to the financial transaction.

As described previously, a general approach to address the second challenge may use the UPOS standard for integrating point-of-sale-terminal software with third-party peripheral devices. In this approach, the third party can publish a UPOS driver or service object for credit-authorization terminals or magnetic-stripe readers. This UPOS driver can be loaded on UPOS compliant point-of-sale terminals (which include the majority of existing point-of-sale terminals). When invoked by the point-of-sale-terminal software in a payment-credential-reading flow, the UPOS driver may use the barcode scanner to acquire the barcode from the display of the portable electronic device, and may convert it into well-formed payment credentials. This financial information may be passed to the point-of-sale-terminal software to be processed in the same way as any other payment-card financial transaction.

Note that a variety of conversion techniques may be used to convert the barcode to the financial information. In general, this conversion does not need to be secure or complicated. In addition, this approach can also deal with the possible limitations associated with barcode scanners or the resolution of displays on portable electronic devices which may restrict the length and symbols represented by the barcode. For example, the standard Universal Product Code includes 11 digits. This may not be sufficient to represent payment-card track data. However, because the UPOS driver can process this Universal Product Code prior to delivering it to the point-of-sale-terminal software, it can be appropriately transformed (thus, the UPOS driver may map the barcode, which includes the identifier, to a one-time payment credential token and, thus, the financial information). For example, the financial information conveyed in a one-time payment credential token may include: a 6-digit bank identification number stored in the configuration of the UPOS driver that guarantees proper routing of the financial transaction by the payment-card network to the financial institution; a virtual (transient) account number defined by 10 digits in the barcode data; an expiration date generated based on the financial-transaction date and other input if desirable; and a card verification value (CVV) or card verification code (CVC) generated based on one or more of these or other inputs, such as the last digit from the barcode (alternatively the last digit can be used to correct barcode-scanning errors).

Figure 3:
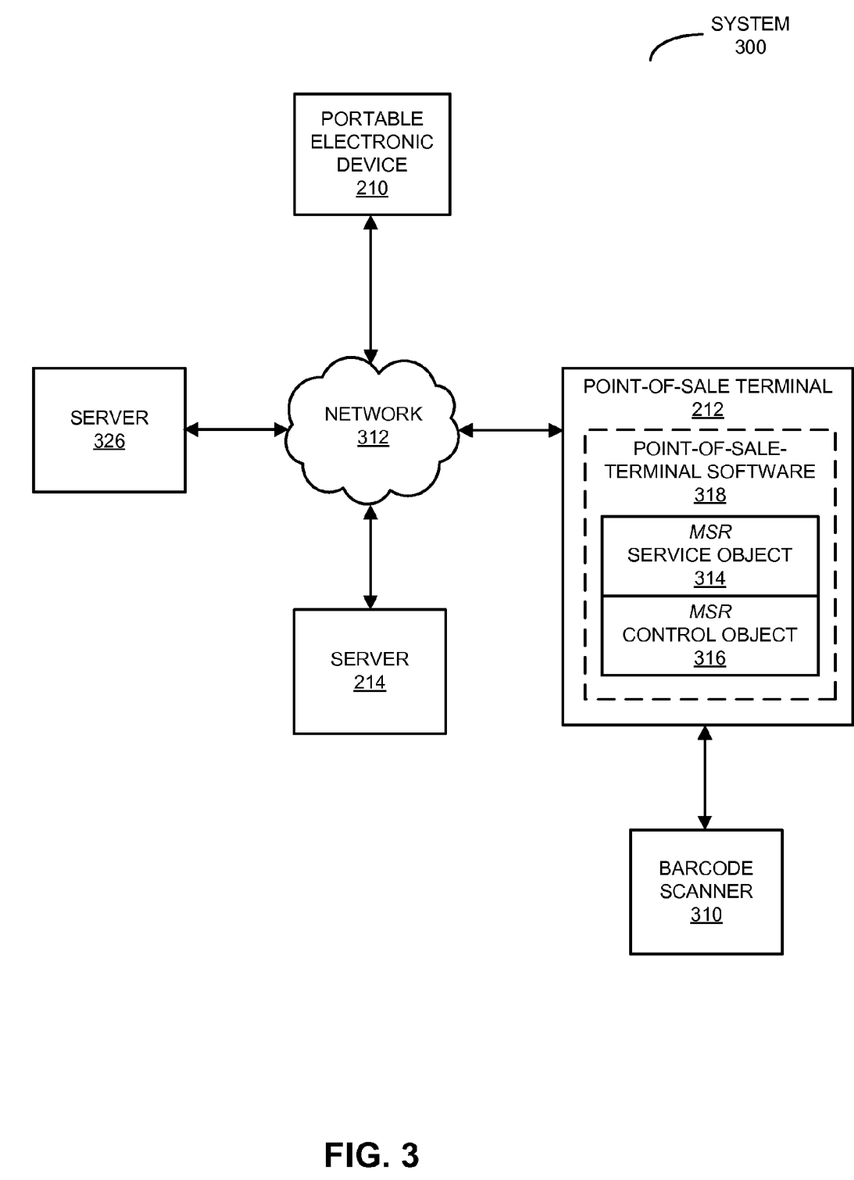
FIG. 3 is a block diagram illustrating a system that performs the method of FIGS. 1 and 2 in accordance with an embodiment of the present disclosure.

We now describe embodiments of the system and the point-of-sale terminal, and their use. FIG. 3 presents a block diagram illustrating a system 300 that performs method 100 (FIGS. 1 and 2). In this system, a user of portable electronic device 210 may use a software product (for example, the mobile-payment application), such as a software application that is resident on and that executes on portable electronic device 210. (Alternatively, the user may interact with a web page that is provided by server 214 via network 312, and which is rendered by a web browser on portable electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on portable electronic device 210 (such as a software application that is provided by server 214 or that is installed and which executes on portable electronic device 210).

As discussed previously, during a financial transaction (such as purchasing a product from a merchant) the user (who is the customer in the preceding discussion) may use the software application to request and receive a one-time payment credential token from server 214 via network 312.

Then, the software application displays the one-time payment credential token (or an identifier corresponding to the one-time payment credential token) in a barcode on a display on portable electronic device 210. This barcode is scanned by barcode scanner 310 and processed by a UPOS driver or service object, such as a magnetic-stripe-reader (MSR) service object 314, to extract the financial information. Note that magnetic-stripe-reader service object 314 may present barcode scanner 310 to point-of-sale terminal 212 as a keyboard to overcome limitations associated with Universal Product Codes, such as the number of digits. Alternatively or additionally, magnetic-stripe-reader service object 314 may accept the token from the keyboard because the input from a barcode scanner is often seen by the point-of-sale terminal as a keyboard input.

Moreover, magnetic-stripe-reader service object 314 provides the financial information to the UPOS control object, such as magnetic-stripe-reader control object 316 (and, thus, point-of-sale-terminal software 318) via a UPOS standard peripheral interface.

Next, magnetic-stripe-reader control object 316 passes the financial information to point-of-sale-terminal software that communicates the financial information and the transaction information to server 326 associated with the financial institution specified in the financial information using network 312. In order to authorize the financial transaction, server 326 may contact server 214 via network 312 to confirm that the one-time payment credential token used to obtain the financial information is the same as that provided by server 214 to portable electronic device 210.

If the one-time payment credential token is the same, server 326 may authorize the financial transaction and provide a confirmation to point-of-sale terminal 212 via network 312. Magnetic-stripe-reader control object 316 may receive the confirmation, which is then passed to point-of-sale-terminal software 318.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

FIG. 4 presents a block diagram illustrating a point-of-sale terminal 400 that performs method 100 (FIGS. 1 and 2), such as point-of-sale terminal 212 (FIGS. 2 and 3). Point-of-sale terminal 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in point-of-sale terminal 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to point-of-sale terminal 400.

Memory 424 may also include multiple program modules (or sets of instructions), including: point-of-sale-terminal software 318 (or a set of instructions), magnetic-stripe-reader service object 314 (or a set of instructions), magnetic-stripe-reader control object 316 (or a set of instructions), encryption module 432 (or a set of instructions) and/or financial application 434 (or a set of instructions). Note that one or more of these program modules (or sets of instructions) may constitute a computer-program mechanism.

Figure 5:
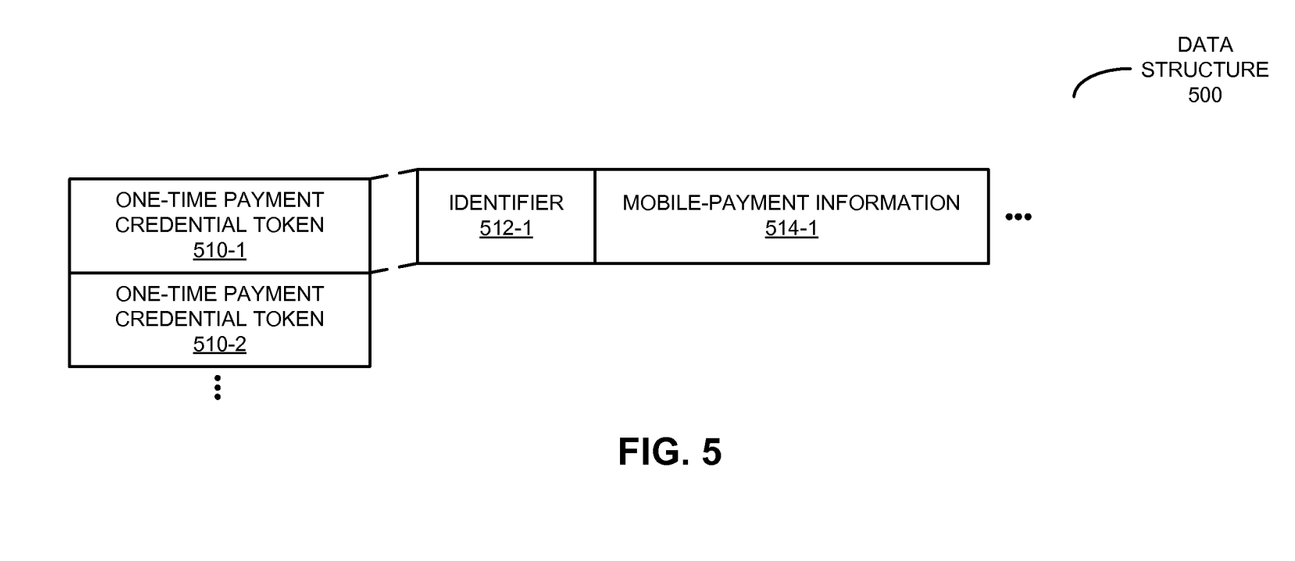
FIG. 5 is a block diagram illustrating a data structure for use in the point-of-sale terminal of FIG. 4 in accordance with an embodiment of the present disclosure.

During the financial transaction in method 100 (FIGS. 1 and 2), barcode scanner 310 and magnetic-stripe-reader service object 314 receive an image of a barcode 436 from a portable electronic device of a customer. Then, magnetic-stripe-reader service object 314 performs one or more operations based on at least identifier 438 in barcode 436 to obtain financial information 440 of the customer. For example, barcode 436 may include one-time payment credential token 442, which may include or may correspond to identifier 438 (e.g., one-time payment credential token 442 may be computed from identifier 438). Magnetic-stripe-reader service object 314 may extract financial information 440 (such as mobile-payment information) from one-time payment credential token 442. Note that one-time payment credential token 442 and financial information 440 may be stored in a data structure. This is shown in FIG. 5, which presents a data structure 500 that includes one-time payment credential tokens 510. In particular, one-time payment credential token 442 may include: identifier 512-1 and mobile-payment information 514-1 (such as an account identifier, an available amount that can be spent, a financial institution, transaction routing information, etc.).

Referring back to FIG. 4, magnetic-stripe-reader service object 314 may provide financial information 440 to magnetic-stripe-reader control object 316 and, thus, point-of-sale-terminal software 318. Next, point-of-sale terminal 400 may directly or indirectly provide financial information 440 and transaction information 444 associated with the financial transaction to a financial institution 446 specified in financial information 440. For example, magnetic-stripe-reader control object 316 may provide financial information 440 and transaction information 444 using communication module 428 and network interface 412.

Furthermore, point-of-sale terminal 400 directly or indirectly receives a confirmation 448 from financial institution 446 that the financial transaction has been completed. For example, magnetic-stripe-reader control object 316 may receive confirmation 448 via communication interface 412 and communication module 428.

Because information in point-of-sale terminal 400 may be sensitive in nature, in some embodiments at least some of the data stored in memory 424 and/or at least some of the data communicated using communication module 428 is encrypted using encryption module 432.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although point-of-sale terminal 400 is illustrated as having a number of discrete items, FIG. 4 is intended to be a functional description of the various features that may be present in point-of-sale terminal 400 rather than a structural schematic of the embodiments described herein. In some embodiments, some or all of the functionality of point-of-sale terminal 400 may be implemented in one or more application-specific integrated circuits (ASICs) and/or one or more digital signal processors (DSPs).

Point-of-sale terminals (such as point-of-sale terminal 400), as well as computers and servers in system 300 (FIG. 3) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

In some embodiments one or more of the modules in memory 424 may be associated with and/or included in a financial application 434. This financial application may include planning software capable of processing financial information. Moreover, financial application 434 may be associated with and/or include payroll or accounting software capable of processing payroll information.

System 300 (FIG. 3), point-of-sale terminal 400 (FIG. 4) and/or data structure 500 may include fewer components or additional components. Moreover, two or more components may be combined into a single component, and/or a position of one or more components may be changed. In some embodiments, the functionality of system 300 (FIG. 3) and/or point-of-sale terminal 400 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A point-of-sale-terminal-implemented method for conducting a financial transaction, the method comprising:
   receiving a one-time payment credential token associated with a customer from a portable electronic device via a peripheral device coupled to the point-of-sale terminal and a service object executing on the point-of-sale terminal, wherein the service object acts as a driver for the peripheral device, wherein the peripheral device includes a barcode scanner that scans a barcode that includes the one-time payment credential token, wherein the barcode represents a sequence of 11 digits,
      wherein the one-time payment credential token is generated by a trusted execution environment executing a technique known to a third party on the portable electronic device, and wherein said technique does not need to connect to the third party prior to the financial transaction, and
      wherein the one-time payment credential token includes financial information of the customer, wherein the financial information includes a 6-digit bank identification number, a virtual account number, an expiration date, and a card verification code;
   performing one or more operations based on at least the one-time payment credential token to obtain the financial information;
   using the point-of-sale terminal, providing the financial information and transaction information associated with the financial transaction to a financial institution specified in the financial information; and
   receiving a confirmation that the financial transaction has been completed.

2. The method of claim 1, wherein the one or more operations include:
   extracting the financial information from the one-time payment credential token.

3. The method of claim 1, wherein the service object includes a magnetic-stripe-reader service object.

4. The method of claim 1, wherein the service object executing on the point-of-sale terminal presents the barcode scanner to the point-of-sale terminal as a keyboard.

5. The method of claim 1, wherein the one or more operations include extracting the financial information from the one-time payment credential token.

6. The method of claim 1, wherein the one-time payment credential token is only valid for the financial transaction.

7. The method of claim 1, wherein the peripheral device is selected from the group consisting of: a barcode scanner, a wireless receiver, and a keyboard.

8. A computer-program product for use in conjunction with a point-of-sale terminal, the computer-program product comprising a non-transitory computer-readable storage medium and a computer-program mechanism embedded therein, to conduct a financial transaction, the computer-program mechanism including:
   instructions for receiving a one-time payment credential token associated with a customer from a portable electronic device via a peripheral device coupled to the point-of-sale terminal and a service object executing on the point-of-sale terminal, wherein the service object acts as a driver for the peripheral device, wherein the peripheral device includes a barcode scanner that scans a barcode that includes the one-time payment credential token, wherein the barcode represents a sequence of 11 digits,
      wherein the one-time payment credential token is generated by a trusted execution environment executing a technique known to a third party on the portable electronic device, and wherein said technique does not need to connect to the third party prior to the financial transaction, and
      wherein the one-time payment credential token includes financial information of the customer, wherein the financial information includes a 6-digit bank identification number, a virtual account number, an expiration date, and a card verification code;
   instructions for performing one or more operations based on at least the one-time payment credential token to obtain the financial information;
   instructions for providing the financial information and transaction information associated with the financial transaction to a financial institution specified in the financial information; and
   instructions for receiving a confirmation that the financial transaction has been completed.

9. The computer-program product of claim 8, wherein instructions for performing one or more operations include:
   instructions for extracting the financial information from the one-time payment credential token.

10. The computer-program product of claim 8, wherein the service object includes a magnetic-stripe-reader service object.

11. The computer-program product of claim 8, wherein the service object executing on the point-of-sale terminal presents the barcode scanner to the point-of-sale terminal as a keyboard.

12. The computer-program product of claim 8, wherein instructions for performing one or more operations include instructions for extracting the financial information from the one-time payment credential token.

13. The computer-program product of claim 8, wherein the one-time payment credential token is only valid for the financial transaction.

14. The computer-program product of claim 8, wherein the peripheral device is selected from the group consisting of: a barcode scanner, a wireless receiver, and a keyboard.

15. A point-of-sale terminal, comprising:
a processor;
memory; and
a program module, wherein the program module is stored in the memory and configurable to be executed by the processor to conduct a financial transaction, the program module including:
instructions for receiving a one-time payment credential token associated with a customer from a portable electronic device via a peripheral device coupled to the point-of-sale terminal and a service object executing on the point-of-sale terminal, wherein the service object acts as a driver for the peripheral device, wherein the peripheral device includes a barcode scanner that scans a barcode that includes the one-time payment credential token, wherein the barcode represents a sequence of 11 digits,
wherein the one-time payment credential token is generated by a trusted execution environment executing a technique known to a third party on the portable electronic device, and wherein said technique does not need to connect to the third party prior to the financial transaction, and
wherein the one-time payment credential token includes financial information of the customer, wherein the financial information includes a 6-digit bank identification number, a virtual account number, an expiration date, and a card verification code;
instructions for performing one or more operations based on at least the one-time payment credential token to obtain the financial information;
instructions for providing the financial information and transaction information associated with the financial transaction to a financial institution specified in the financial information; and
instructions for receiving a confirmation that the financial transaction has been completed.

16. The point-of-sale terminal of claim 15, wherein instructions for performing one or more operations include:
instructions for extracting the financial information from the one-time payment credential token.

17. The point-of-sale terminal of claim 15, wherein the service object executing on the point-of-sale terminal presents the barcode scanner to the point-of-sale terminal as a keyboard.

18. The point-of-sale terminal of claim 15, wherein instructions for performing one or more operations include instructions for extracting the financial information from the one-time payment credential token.

19. The point-of-sale terminal of claim 15, wherein the peripheral device is selected from the group consisting of: a barcode scanner, a wireless receiver, and a keyboard.

* * * * *